3,282,794
METHOD OF PRODUCING CITRULLINE BY BACTERIAL FERMENTATION
Shinji Okumura, Yokohama-shi, and Masao Shibuya, Shimpachi Konishi, Teruo Shiro, and Noboru Katsuya, Kawasaki-shi, Japan, assignors to Ajinomoto Co., Inc., Tokyo, Japan
No Drawing. Filed Sept. 11, 1964, Ser. No. 395,914
Claims priority, application Japan, Sept. 19, 1963, 38/49,438
5 Claims. (Cl. 195—29)

This invention relates to the production of L-citrulline (hereinafter referred to simply as "citrulline") by bacterial fermentation.

The object of the invention is the production of citrulline at low cost from readily available raw materials.

Citrulline, arginine and ornithine are intermediate products in the formation of urea in the human body and other living body and are, therefore, of interest to biochemists and biologists. They also have been finding applications in medical research, as intermediates in the production of other compounds valuable to biochemists and as food additives.

Citrulline was first isolated from water melon juice. It has also been synthesized by chemical and biochemical methods, some of which are based on the hydrolysis of arginine.

We have found that citrulline is produced in relatively high concentrations by certain auxotrophic mutant strains of *Bacillus subtilis* which require arginine for growth. When such microorganisms are cultured under aerobic conditions in arginine containing nutrient media which may, otherwise be conventional, citrulline may be accumulated in the media by fermentation in concentration as high as 1 to 2 grams per deciliter.

While it is believed that the mutant strains of *Bacillus subtilis* employed in our method may be found in nature, they are more conveniently obtained by screening microorganisms whose vegetative cells or spores were exposed to ultra-violet light, X-rays, gamma rays, and similar electromagnetic radiation. The mutant strains of *Bacillus subtilis* which are useful in our method are also found when parent strains of the microorganism are placed in contact with a solution of sodium nitrate. Other known mutation inducing treatments may also be used.

The mutant strains of *Bacillus subtilis* which produce citrulline by fermentation are characterized by their requirement for arginine. When such closely related amino acids as L-citrulline or L-ornithine are substituted for the arginine in the culture medium, growth stops and citrulline is not produced.

The culture media employed for producing L-citrulline according to our method may be entirely conventional in other respects. They must contain an assimilable carbon source, an assimilable nitrogen source, and the usual minor nutrients. Suitable carbon sources include carbohydrates, such as glucose, fructose, maltose, sucrose, xylose, galactose, starch hydrolyzate and molasses, but also glycerol. Organic acids such as acetic acid, fumaric acid, maleic acid, lactic acid, a-keto-glutaric acid, gluconic acid, pyruvic acid and citric acid may be employe as supplemental carbon sources.

Nitrogen may be provided by ammonium salts of inorganic or organic acids, such as hydrochloric, phosphoric, nitric, acetic and lactic acid, by urea, and by ammonia in aqueous solution, or in the gaseous state.

Supplemental inorganic nutrients include the essential inorganic ions available from potassium phosphate, magnesium sulfate, manganese sulfate, zinc sulfate, ferrous sulfate, sodium chloride and calcium carbonate. Organic growth promoting agents which improve the yield and the rate of production of citrulline include amino acids generally, biotin, vitamins and fatty acids, and may be added to the culture medium in the form of substances which yield the active agent under the conditions of fermentation, such as meat extract, peptone, yeast extract, corn steep liquor, skim milk, chlorella extract, soybean protein hydrolyzate, and various other extracts of vegetal and animal tissues, well known in themselves.

Arginine should be present in the culture medium in a preferred concentration of 5 to 100 mg. per deciliter. At lower arginine concentrations, the growth rate of the microorganisms and the rate of citrulline production are very low. At higher arginine concentrations, the growth of the microorganisms normally proceeds rapidly but the rate of citrulline production is reduced. If the growth of the microorganisms is restrained by known modifications of the fermentation conditions, adequate yields of citrulline can be obtained at arginine concentrations above the preferred range indicated.

As will be shown in more detail in Examples 3 and 4 hereinafter, L-leucine or L-isoleucine simultaneously present with the arginine further accelerate the formation of L-citrulline. An addition at least 50 mg./dl. L-leucine or L-isoleucine to the culture medium can increase the yield of citrulline by 10 to 15 perecnt over an otherwise identical fermentation procedure, and higher concentrations can even further improve the yield.

Best yields of citrulline at a high rate cannot be obtained unless the hydrogen ion concentration in the culture medium is controlled. We therefore prefer to operate the culture media between pH 6.0 and pH 9.0. Aqueous ammonia, calcium carbonate or alkali metal hydroxides may be added to the nutrient medium from time to time, as required to maintain the desired pH range.

The fermentation is carried out under aerobic conditions. The nutrient media may be exposed to oxygen by shaking, by stirring or by passing air through the same. For best results, the temperature of the medium should be held between 24° and 40° C. during fermentation.

The citrulline content of the nutrient media was determined by microbioassay using *Lactobacillus casei* (ATCC 7469), but any other known method may be employed for the purpose. The isolated amino acid was identified by paper chromatography and by its characteristic infrared spectrum.

The recovery of citrulline from the nutrient media may follow known methods. The bacterial cells may be removed by filtration or by centrifuging, and citrulline may then be adsorbed from the liquid on ion exchange resins and separated from accompanying materials by selective elution.

The following examples are further illustrative of the method of the invention, but it will be appreciated that the invention is not limited thereto.

EXAMPLE 1

*Bacillus subtilis* K–X–1 A–9 (ATCC No. 15562) was isolated by screening from *Bacillus subtilis* K strain irradiated with X-rays on the basis of its arginine requirement. It was cultured on a boullion agar slant and an inoculum was transferred to a nutrient medium.

A nutrient solution was prepared to contain

| | | |
|---|---|---|
| Sweet-potato starch hydrolyzate (glucose equivalent) | percent | 10 |
| $KH_2PO_4$ | do | 0.1 |
| $MgSO_4 \cdot 7H_2O$ | do | 0.04 |
| $Fe^{++}$ | p.p.m | 2 |
| $Mn^{++}$ | p.p.m | 2 |
| Mixed amino acids | percent | 0.3 |
| L-arginine hydrochloride | mg./dl | 10 |
| Biotin | micrograms/liter | 40 |
| Thiamine hydrochloride | do | 200 |
| Skim milk | percent | 0.3 |

The pH of the solution was 7. 20 milliliter batches of the solution were placed in 500 ml. shaking flasks, and were sterilized by steam in the flasks at 110° C. for 5 minutes. They were then inoculated with above-mentioned microorganism whereafter 1% of separately sterilized dibasic ammonium phosphate and 1 g. calcium carbonate were added to the medium and the fermentation was carried out at 31° C. under shaking. After 24 hours of fermentation, the dibasic ammonium phosphate was added to the broth in an amount of approximately 2 percent.

The total fermentation period was 72 hours, and the ultimate citrulline content of the broth, as determined by bioassay, was 1.2 g./dl. This result and other data on the composition of the medium during fermentation are listed below:

| Fermentation time, hours | pH | Glucose consumed, g./dl. | Citrulline formed, g./dl. |
|---|---|---|---|
| 24 | 7.2 | 2.5 | 0.13 |
| 48 | 7.8 | 5.7 | 0.72 |
| 72 | 8.0 | 9.2 | 1.20 |

The microbial cells were separated from the broth by filtration, and the filtrate was passed over a column packed with a cation exchange resin of the H type. The citrulline was eluted from the column with 1.0 N ammonium hydroxide solution and crystals of the crude product were precipitated from the eluate by the addition of absolute ethanol. The crystals were dissolved in water, the solution was decolorized by treatment with activated carbon, and purified crystals were precipitated. They were further recrystallized from a small amount of hot water. One liter of broth which had contained 12 grams citrulline yielded 10.2 grams of the pure acid in crystalline form.

EXAMPLE 2

*Bacillus subtilis* K-X-1 A-1 (ATCC No. 15561) was obtained from *Bacillus subtilis*, K strain, by irradiation with X-rays and was selected by its requirement for arginine. The microorganisms were cultured in substantially the same manner as described in Example 1 (Note: In this case, 1 g. calcium carbonate only was added to each medium and the fermentation was carried out at 34° C. under aeration and agitation) on a culture medium prepared to the following initial composition:

| | | |
|---|---|---|
| Sweet potato starch hydrolyzate (glucose equivalent) | percent | 13 |
| $KH_2PO_4$ | do | 0.3 |
| $MgSO_4 \cdot 7H_2O$ | do | 0.04 |
| $Fe^{++}$ | p.p.m | 2 |
| $Mn^{++}$ | p.p.m | 2 |
| Mixed amino acids | percent | 0.3 |
| Soybean protein hydrolyzate | ml./dl | 1 |
| L-arginine HCl | percent | 0.01 |
| Biotin | micrograms/liter | 40 |
| Thiamine hydrochloride | do | 200 |
| $NH_4Cl$ | percent | 1.5 |
| pH | | 7 |

After 24 hours of fermentation, ammonium chloride was added to the nutrient medium in an amount of approximately 1.5%. After 72 hours of fermentation at 34° C., the culture medium was found to contain 1.6 g./dl. citrulline.

EXAMPLE 3

The procedure of Example 2 was repeated with a culture medium additionally containing 0.1% L-leucine, but otherwise identical with that described above. The citrulline content of the culture medium after 72 hours was 1.9 grams per deciliter, an increase of almost 20 percent over the result achieved under otherwise identical conditions in the absence of L-leucine.

EXAMPLE 4

The procedure of Example 2 was repeated with a culture medium additionally containing 0.1% L-isoleucine, but otherwise identical with that described above. The citrulline content of the culture medium after 72 hours was 1.8 grams per deciliter and thus almost equal to that achieved in the presence of L-leucine.

While the invention has been described with particular reference to specific embodiments, it is to be understood that it is not limited thereto, but is to be construed broadly and restricted solely by the scope of the appended claims.

What we claim is:

1. A method of producing L-citrulline which comprises culturing an arginine requiring auxotrophic mutant strain of *Bacillus subtilis* on an aqueous nutrient medium under aerobic conditions, said medium including an assimilable carbon source, an assimilable nitrogen source, an organic nutrient, essential inorganic ions, and an amount of arginine substantially between 5 and 100 milligrams per deciliter of said medium.

2. A method as set forth in claim 1, wherein said nutrient medium additionally includes at least 50 mg. L-leucine per deciliter of said nutrient medium.

3. A method as set forth in claim 1, wherein said nutrient medium additionally includes at least 50 mg. L-isoleucine per deciliter of said nutrient medium.

4. A method as set forth in claim 1, wherein said mutant strain of *Bacillus subtilis* is the strain K-K-1 A-9.

5. A method as set forth in claim 1, wherein said mutant strain of *Bacillus subtilis* is the strain K-X-1 A-1.

No references cited.

A. LOUIS MONACELL, *Primary Examiner.*

L. SHAPIRO, *Assistant Examiner.*